(12) United States Patent
Liu et al.

(10) Patent No.: US 10,487,404 B2
(45) Date of Patent: Nov. 26, 2019

(54) ADHESION PROMOTING PROCESS FOR METALLISATION OF SUBSTRATE SURFACES

(71) Applicant: Atotech Deutschland GmbH, Berlin (DE)

(72) Inventors: Zhiming Liu, Englewood, CO (US); Hailuo Fu, Westminster, CO (US); Sara Hunegnaw, Denver, CO (US); Lutz Brandt, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 210 days.

(21) Appl. No.: 14/915,285

(22) PCT Filed: Sep. 22, 2014

(86) PCT No.: PCT/EP2014/070145
§ 371 (c)(1),
(2) Date: Feb. 29, 2016

(87) PCT Pub. No.: WO2015/044091
PCT Pub. Date: Apr. 2, 2015

(65) Prior Publication Data
US 2016/0208387 A1 Jul. 21, 2016

(30) Foreign Application Priority Data

Sep. 26, 2013 (EP) .................................. 13186150

(51) Int. Cl.
*B05D 3/02* (2006.01)
*B05D 7/00* (2006.01)
(Continued)

(52) U.S. Cl.
CPC ...... *C23C 18/1653* (2013.01); *C03C 17/3618* (2013.01); *C03C 17/3642* (2013.01);
(Continued)

(58) Field of Classification Search
CPC ..... C04B 41/51; C23C 18/1653; C23C 28/00; C23C 28/345; C23C 28/3455; C25D 5/50
(Continued)

(56) References Cited

U.S. PATENT DOCUMENTS 3,907,621 A 9/1975 Polichette et al.
4,659,587 A 4/1987 Imura et al.
(Continued)

FOREIGN PATENT DOCUMENTS

CN 101983757 A * 3/2011 ............. B01D 71/02
CN 103183978 7/2013
(Continued)

OTHER PUBLICATIONS

Vonau et al. ("New Solid-State Glass Electrodes by Using Zinc Oxide Thin Films as Interface Layer," J Solid State Electrochem (no month, 2009), vol. 13, pp. 91-98. (Year: 2009).*
(Continued)

*Primary Examiner* — Edna Wong
(74) *Attorney, Agent, or Firm* — Renner, Otto, Boisselle & Sklar, LLP (57) ABSTRACT

A method is provided for metallisation of non-conductive substrates providing a high adhesion of the deposited metal to the substrate material and thereby forming a durable bond. The method applies a metal oxide adhesion promoter which is activated and then metal plated. The method provides high adhesion of the non-conductive substrate to the plated metal layer.

18 Claims, 6 Drawing Sheets

(51) Int. Cl.
| | |
|---|---|
| C23C 28/00 | (2006.01) |
| C23C 18/16 | (2006.01) |
| C25D 5/50 | (2006.01) |
| C25D 5/54 | (2006.01) |
| C23C 18/12 | (2006.01) |
| C23C 18/18 | (2006.01) |
| C23C 18/34 | (2006.01) |
| C23C 18/40 | (2006.01) |
| C03C 17/36 | (2006.01) |
| C23C 18/14 | (2006.01) |

(52) U.S. Cl.
CPC ...... *C03C 17/3697* (2013.01); *C23C 18/1212* (2013.01); *C23C 18/1216* (2013.01); *C23C 18/1245* (2013.01); *C23C 18/1295* (2013.01); *C23C 18/14* (2013.01); *C23C 18/165* (2013.01); *C23C 18/1639* (2013.01); *C23C 18/1642* (2013.01); *C23C 18/1651* (2013.01); *C23C 18/1667* (2013.01); *C23C 18/1692* (2013.01); *C23C 18/1694* (2013.01); *C23C 18/1879* (2013.01); *C23C 18/1893* (2013.01); *C23C 18/34* (2013.01); *C23C 18/40* (2013.01); *C23C 28/322* (2013.01); *C23C 28/345* (2013.01); *C25D 5/50* (2013.01); *C25D 5/54* (2013.01)

(58) Field of Classification Search
USPC ..... 427/380, 419.2; 205/183, 184, 185, 187, 205/224
See application file for complete search history.

(56) References Cited

U.S. PATENT DOCUMENTS

| | | | |
|---|---|---|---|
| 4,780,332 A | 10/1988 | Pitz et al. | |
| 6,627,544 B2 | 9/2003 | Izumi et al. | |
| 2002/0187266 A1 | 12/2002 | Izumi et al. | |
| 2004/0003873 A1 * | 1/2004 | Chen | C22F 1/02 148/518 |
| 2011/0076390 A1 * | 3/2011 | Cerio, Jr. | C23C 18/161 427/96.8 |

FOREIGN PATENT DOCUMENTS

| | | | | |
|---|---|---|---|---|
| EP | 2602357 | | 6/2013 | |
| GB | 1323742 | | 7/1973 | |
| JP | 04201251 A | * | 7/1992 | B32B 15/04 |
| JP | 5331660 | | 12/1993 | |
| JP | 2001247577 | | 9/2001 | |
| JP | 2004202672 | | 7/2004 | |
| WO | WO-2010001108 A1 | * | 1/2010 | H01L 29/78681 |
| WO | 2013083600 | | 6/2013 | |

OTHER PUBLICATIONS

Zhou et al., "Effects of Dopants and Hydrogen on the Electrical Conductivity of ZnO," Journal of the European Ceramic Society (no month, 2004), vol. 24, pp. 139-146. (Year: 2004).*

Vonau et al., "New Solid-State Glass Electrodes by Using Zinc Oxide Thin Films as Interface Layer," J Solid State Electrochem (2009), vol. 13, pp. 91-98. (Year: 2009).*

Ghimbeau et al., "Electrostatic Spray Deposited Zinc Oxide Films for Gas Sensor Applications," Applied Surface Science (2007), vol. 253, pp. 7483-7489. (Year: 2007).*

Zhou et al., "Effects of Dopants and Hydrogen on the Electrical Conductivity of ZnO," Journal of the European Ceramic Society (2004), vol. 24, pp. 139-146. (Year: 2004).*

Yoshiki et al., "Electroless Copper Plating Using ZnO Thin Film Coated on a Glass Substrate," J. Electrochem. Soc. (May 1994), vol. 141, No. 5, pp. L56-L58. (Year: 1994).*

Alam et al., "Preparation and Properties of Transparent Conductive Aluminum-Doped Zinc Oxide Thin Films by Sol-Gel Process," J. Vac. Sci. Technol. A (Jul./Aug. 2001), vol. 19, No. 4, pp. 1642-1646. (Year: 2001).*

Ghimbeu et al., "Electrostatic Spray Deposited Zinc Oxide Films for Gas Sensor Applications," Applied Surface Science (2007), vol. 253, pp. 7483-7489. (Year: 2007).*

Teraoka et al., "Room-Temperature Formation of a ZnO-Based Adhesion Layer for Nanoprecision Cu/Glass Metallization," Japanese Journal of Applied Physics (2013), vol. 52, pp. 1-6. (Year: 2013).*

Fu et al., "Adhesive Enabling Technology for Directly Plating Copper onto Glass/Ceramic Substrates," 2014 Electronic Component & Technology Conference (© 2014), IEEE, pp. 1652-1655. (Year: 2014).*

PCT/EP2014/070145; PCT International Search Report and Written Opinion of the International Searching Authority dated Nov. 28, 2014.

PCT/EP2014/070145; PCT International Preliminary Report on Patentability dated Dec. 23, 2015.

Search Report for corresponding Chinese Application No. 201480052346.4 dated Jun. 20, 2017.

Search Report for corresponding Japanese Application No. 2016-517391 dated Oct. 15, 2018.

Search Report for corresponding Chinese Application No. 201480052346.4 dated Jul. 19, 2018.

R.D. Sun et al.; Formation of Catalytic Pd on ZnO Thin Films for Electroless Metal Deposition; J. Electrochem. Soc., vol. 145, No. 10, Oct. 1998; pp. 3378-3382.

* cited by examiner

ADHESION PROMOTING PROCESS FOR METALLISATION OF SUBSTRATE SURFACES

The present application is a U.S. National Stage Application based on and claiming benefit and priority under 35 U.S.C. § 371 of International Application No. PCT/EP2014/070145, filed 22 Sep. 2014, which in turn claims benefit of and priority to European Application No. 13186150.2 filed 26 Sep. 2013, the entirety of both of which is hereby incorporated herein by reference.

FIELD OF THE INVENTION

The present invention relates to novel processes for metallisation of non-conductive substrates like glass, ceramic and silicon-based semiconductor type surfaces applying catalytically active metal oxide compositions. The method results in metal plated surfaces exhibiting high adhesion between the glass or ceramic substrate and the plated metal while at the same time leaving the smooth substrate surface intact.

The invention can be applied in the area of printed electronic circuits such as fine line circuitry on glass and ceramics for signal distribution (flip chip glass interposers), flat panel display and radio frequency identification (RFID) antennas. A typical area of application is the advanced packaging industry. Also, it can be applied in metal plating of silicon-based semiconductor substrates.

BACKGROUND OF THE INVENTION

Various methods to metallise substrates are known in the art.

Conductive substrates can be directly plated with another metal by various wet chemical plating processes, e.g. electroplating or electroless plating. Such methods are well established in the art. Usually, a cleaning pretreatment is applied to the substrate surface before the wet chemical plating process is applied to ensure a reliable plating result.

Various methods are known of coating non-conductive surfaces. In wet chemical methods, the surfaces to be metallised are, after an appropriate preliminary treatment, firstly catalysed and then metallised in an electroless manner and thereafter, if necessary, metallised electrolytically. With the introduction of more advanced technologies, hitherto used organic substrates are less suitable because of their relatively poor dimensional stability and coplanarity, which limits them in terms of Input/Output (I/O) pitch. Inorganic interposers made of silicon or glass allow for straightforward matching of the Coefficient of Thermal Expansion of the interposer to the Silicon Chip. Silicon has a mature manufacturing base but suffers from some disadvantages when compared to glass. In particular glass has inherently superior electrical properties than silicon and offers the possibility to use larger area panel sizes, which results in significant cost savings versus a wafer based platform. A reliable plating technology for good adhesion of copper to glass is a critical prerequisite for the use of glass substrates in the electronic packaging market.

This is a challenge however, as metallization of a very smooth glass with a surface roughness of <10 nm is significantly more challenging than plating on an organic substrate. Methods that depend solely on mechanical anchoring from substrate roughening were tested for adhesion performance. However, this requires strong roughening of the substrate surface which negatively impacts the functionality of the metallised surface, e.g. in printed electronic circuits or Radio Frequency Identification (RFID) antennas.

Wet-chemically etching with either HF containing acidic media or hot NaOH, KOH or LiOH containing alkaline media can be employed for both cleaning and roughening of the non-conductive substrates, particularly glass or ceramic type substrates. Adhesion is then provided by additional anchoring sites of the roughened surface.

In EP 0 616 053 A1 there is disclosed a method for direct metallisation of non-conductive surfaces, in which the surfaces are firstly treated with a cleaner/conditioner solution, thereafter with an activator solution, for example a colloidal palladium solution, stabilised with tin compounds, and are then treated with a solution which contains compounds of a metal which is more noble than tin, as well as an alkali hydroxide and a complex former. Thereafter the surfaces can be treated in a solution containing a reducing agent, and can finally be electrolytically metallised.

WO 96/29452 concerns a process for the selective or partial electrolytic metallisation of surfaces of substrates made from electrically non-conducting materials which for the purpose of the coating process are secured to plastic-coated holding elements. The proposed process involves the following steps: a) preliminary treatment of the surfaces with an etching solution containing chromium (VI) oxide; followed immediately by b) treatment of the surfaces with a colloidal acidic solution of palladium-/tin compounds, care being taken to prevent prior contact with adsorption-promoting solutions; c) treatment of the surfaces with a solution containing a soluble metal compound capable of being reduced by tin (II) compounds, an alkali or alkaline earth metal hydroxide, and a complex forming agent for the metal in a quantity sufficient at least to prevent precipitation of metal hydroxides; d) treatment of the surfaces with an electrolytic metallisation solution.

Alternatively, conductive polymers can be formed on the non-conductive surface to provide a first conductive layer for subsequent metal plating of the surface.

US 2004/0112755 A1 describes direct electrolytic metallisation of electrically non-conducting substrate surfaces comprising bringing the substrate surfaces into contact with a water-soluble polymer, e.g. a thiophene; treating the substrate surfaces with a permanganate solution; treating the substrate surfaces with an acidic aqueous solution or an acidic microemulsion of an aqueous base containing at least one thiophene compound and at least one alkane sulfonic acid selected from the group comprising methane sulfonic acid, ethane sulfonic acid and ethane disulfonic acid; electrolytically metallizing the substrate surfaces.

U.S. Pat. No. 5,693,209 is directed to a process for directly metallizing a circuit board having non-conductor surfaces, includes reacting the non-conductor surface with an alkaline permanganate solution to form manganese dioxide chemically adsorbed on the non-conductor surface; forming an aqueous solution of a weak acid and of pyrrole or a pyrrole derivative and soluble oligomers thereof; contacting the aqueous solution containing the pyrrole monomer and its oligomers with the non-conductor surface having the manganese dioxide adsorbed chemically thereon to deposit an adherent, electrically conducting, insoluble polymer product on the non-conductor surface; and directly electrodepositing metal on the non-conductor surface having the insoluble adherent polymer product formed thereon. The oligomers are advantageously formed in aqueous solution containing 0.1 to 200 g/l of the pyrrole monomer at a temperature between room temperature and the freezing point of the solution.

Ren-De Sun et al. (Journal of the Electrochemical Society, 1999, 146:2117-2122) teach the deposition of thin ZnO layers on glass by spray pyrolysis, followed by wet chemical Pd activation and electroless deposition of Cu. They reported a moderate adhesion between the deposited copper layer and the glass substrate. The thickness of the deposited copper is about 2 μm.

EP 2 602 357 A1 relates to a method for metallization of substrates providing a high adhesion of the deposited metal to the substrate material and thereby forming a durable bond. The method applies novel adhesion promoting agents comprising nanometer-sized oxide particles prior to metallization. The particles are selected from one or more of silica, alumina, titania, zirconia, tin oxide and zinc oxide particles which have at least one attachment group bearing a functional chemical group suitable for binding to the substrate. The particles are functionalized by having at least one attachment group bearing a functional chemical group suitable for binding to the substrates. These nanometer-sized particles are attached to the substrate and remain chemically unchanged before a subsequent metal plated layer is attached to the substrate surface.

JP H05-331660 A relates to the formation of a copper oxide film on a substrate bearing a zinc oxide layer. Such method comprises the following steps i) apply a zinc acetate solution to a substrate surface, ii) deposit a copper layer onto the substrate surface, iii) oxidise the plated copper layer to form a copper oxide at a temperature of about 300 to 500° C. in an oxygen containing atmosphere, iv) partially reduce the copper surface and v) form an electrolytic copper coating. The method is not directed to formation of metal oxide layers for adhesion promotion. Depending on the chemical nature of substrate surface, the type of the plated metal and the thickness of the plated metal layer, adhesion of the plated metal layer to said surface can be an issue. For example, adhesion can be too low to provide a reliable bond between the metal layer and the underlying substrate.

Furthermore, such methods tend to require additional steps in the substrate preparation that are not typically easily controllable for uniform surface roughness.

Moreover, the problem of large CTE (coefficient of thermal expansion) mismatch between glass (CTE=3-8 ppm) and subsequently plated metal, typically copper (CTE=about 16 ppm) is not addressed, which often leads to delamination from the bare glass.

OBJECTIVE OF THE INVENTION

In summary there is a strong industrial drive to ceramic and glass substrates for electronic applications requiring a suitable adhesion promoter for plated copper which does not alter the substrate properties unfavourably and which is economically feasible.

It is therefore the objective of the present invention to provide a method for metallisation of substrates providing a high adhesion of the deposited metal, preferably copper, to the substrate material and thereby forming a durable bond without substantially increasing the roughness of the surface.

Furthermore, it is the object of the present invention to be able to completely or selectively metallise a substrate surface.

SUMMARY OF THE INVENTION

These objects are solved by a wet chemical method for plating a metal onto a non-conductive substrate comprising the steps of
 i. depositing on at least a portion of the non-conductive substrate surface a layer of a metal oxide compound selected from the group consisting of zinc oxides, titanium oxides, zirconium oxides, aluminum oxides, silicon oxides, and tin oxides or mixtures of the aforementioned and thereafter
 ii. heating the non-conductive substrate and thereby forming an adhesive layer of the metal oxide compound on at least a portion of the substrate surface; and thereafter
 iii. metal plating at least the substrate surface bearing the adhesive layer of the metal oxide compound by applying a wet-chemical plating method and thereafter;
 iv. heating of the metal plated layer to a maximum temperature of between 150 and 500° C.

The method provides metal deposits on the non-conductive substrates exhibiting high adhesion of the deposited metal to the substrate material and thereby forming a durable bond. A thin layer of metal oxide was obtained according to a method according to the present invention which can be used as a robust, cost-effective adhesive layer, which is particularly suitable on very smooth glass substrates.

BRIEF DESCRIPTION OF THE FIGURES

FIG. 4 shows the interfacial layer formation as schematic diagram. The metal oxide has been deposited on a glass substrate and is then subsequently sintered. The metal oxide thereby becomes crystalline and an interfacial layer of ternary alloys of metal, silica and oxide is formed between the substrate and the metal oxide layer.

C. (top of the figure), respectively. The signals refer to the ZnO plane orientations 100, 002, and 101 at 31.8, 34.5, and 36.3 2-theta, respectively. The substrate which was being sintered for 3 h at 300° C. showed no crystallinity and allowed for a peel strength of 0 N/cm. The substrate which was being sintered for 1 h at 400° C. resulted in a peel strength of 1.5 N/cm and showed a certain degree of crystallinity, whereas the substrate which was sintered for 1 h at 500° C. was mostly crystalline and gave a peel strength of 6 N/cm.

Relative intensities are, however, different from those cited in the JCPDS (joint committee of powder diffraction standards) database for "non-oriented" ZnO powder with the 101 signal showing the highest intensity. The fact that in the present invention always the 002 signal has the highest intensity signifies preferential orientation of the crystallites.

Increasing signal intensity with increasing sintering temperatures also indicates the increasing degree of crystallinity of the ZnO layer. The sintering temperature therefore directly correlates to the crystallinity and achievable peel strength. A preferred sintering temperature of about 400° C. is recommended to form a mechanically stable ZnO layer for this set of experimental conditions. Samples were processed according to Example 3c using different ZnO sintering temperatures.

DETAILED DESCRIPTION OF THE INVENTION

The present invention provides a metal plating method for metallisation of non-conductive substrates.

Non-conductive substrates suitable to be treated with the plating method according to the present invention comprise glass, ceramic and silicon-based semiconductor materials (also denoted Wafer substrates).

Examples for glass substrates comprise silica glass (amorphous silicon dioxide materials), soda-lime glass, float glass, fluoride glass, aluminosilicates, phosphate glass, borate glass, borosilicate glass, chalcogenide glass, glass-ceramic materials, aluminium oxide, silicon having an oxidized surface. Substrates of this type are utilized for example as interposers for micro-chip packages and the like. The treatment of glass substrates with a method according to the present invention is particularly preferred, particularly the treatment of smooth glass with a surface roughness of less than 50 nm.

Silicon-based semiconductor materials are used in the Wafer industry.

Ceramic substrates comprise technical ceramics like oxide based alumina, beryllia, ceria, zirconia oxides or barium based ceramics like $BaTiO_3$ and nonoxides like carbide, boride, nitride and silicide.

Such non-conductive substrates, particularly glass and Wafer substrates, often have a smooth surface. A "smooth surface" of a non-conductive substrate is defined herein by means of the average surface roughness of the surface $S_a$ according to ISO 25178 as determined by optical interference microscopy. The values for the parameter $S_a$ of a "smooth surface" preferably ranges from 0.1 to 200 nm, more preferably from 1 to 100 nm and even more preferably from 5 to 50 nm for glass substrates. For ceramic substrates the surface roughness often is higher. It can be up to an $S_a$ value of 1000 nm, e.g. range between 400 to 600 nm.

Substrates, such as glass and Wafer substrates, having such a smooth surface and a $S_a$ value of from 0.1 to 200 nm are particularly preferred. Most preferred are glass substrates.

The non-conductive substrate is preferably cleaned prior to contacting it with the metal oxide precursor compound. Suitable cleaning methods comprise immersing the substrate in a solution comprising a surface active substance, immersing the substrate in a polar organic solvent or mixture of polar organic solvents, immersing the substrate in an alkaline solution and a combination of two or more of the aforementioned cleaning methods.

Glass substrates for example can be cleaned by immersion into a mixture of 30 wt. % $NH_4OH$, 30 wt. % $H_2O_2$, and water for 30 min followed by immersion into a mixture of 35 wt. % HCl, 30 wt. % $H_2O_2$, and water for 30 min. After this substrates are rinsed in DI water and dried.

Metal oxide compounds as defined herein are compounds selected from the group consisting of zinc oxides, titanium oxides, zirconium oxides, aluminum oxides, silicon oxides, and tin oxides or mixtures of the aforementioned. The valency of the metal ions can vary. However, some metals predominately occur in one valency, e.g. zinc is almost always zinc(II), thus forming Zn(II)O oxide species.

Metal oxide precursor compounds are defined herein as compounds which serve as a source of the corresponding metal oxides. The precursor compounds are capable of forming thin metal oxide layers on the surface of the non-conductive substrate upon heating. Generally, all metal salts are suitable which form the corresponding metal oxide upon heating. Preferably, heating is under the presence of oxygen. The oxide of the corresponding metal itself generally is not applied directly because it is only poorly soluble in both aqueous as well as organic solvents and therefore difficult to homogeneously apply to the substrate surface.

Most often the corresponding oxides are obtained by heating of the metal oxide precursor compounds. Pyrolysis is a heat treatment process in presence of oxygen. Pyrolysis of the metal oxide precursor compounds results in formation of the corresponding metal oxide compound.

Typical metal oxide precursor compounds comprise soluble salts of the respective metal. The metal oxide precursor compounds can be organic metal salts and for example be alkoxylates, e.g. methoxylate, ethoxylate, propoxylate and butoxylate, acetates, and acetyl-acetonates. Alternatively, the metal oxide precursor compounds can be inorganic metal salts and for examples be nitrates, halides, particularly chlorides, bromides and iodides.

The metal oxide precursor compounds differ from the nanometre-sized oxide particles according to EP 2 602 357 A1 by not being functionalised by having at least one attachment group bearing a functional chemical group suitable for binding to the substrate.

The metal of the metal oxide precursor compound is selected from the group consisting of zinc, titanium, zirconium, aluminium, silicon and tin or mixtures of the aforementioned.

The metal oxide compound or metal oxide precursor compound can be doped with germanium, aluminum, boron, arsenic or phosphorous, generally in a content of between $10^{-9}$-10 wt. %. Such doping is well known to the person skilled in the art and increases the conductivity of the metal oxide layer. When the conductivity is high enough the metal oxide layer can directly be electrolytically plated with wet-chemical plating methods known in the art and described herein.

The metal oxide compound formed in step ii. described above is preferably selected from the group consisting of ZnO, $TiO_2$, $ZrO_2$, $Al_2O_3$, $SiO_2$, $SnO_2$ or mixtures of the aforementioned.

Zinc oxide is the most preferred metal oxide compound to be applied in a method according to the present invention. Typical zinc oxide precursor compounds are zinc acetate, zinc nitrate, zinc chloride, zinc bromide, and zinc iodide. Another preferred oxide is aluminium oxide. Typical aluminium oxide precursor compounds are acetate, nitrate, chloride, bromide, and iodide of aluminium.

The metal oxide precursor compounds are generally dissolved in a suitable solvent prior to its application to the surface of the non-conductive substrate. This facilitates a homogeneous surface distribution on the substrate surface of the compounds. Suitable solvents comprise water, polar organic solvents, particularly alcohols like ethanol, propranol, iso-propanol, methoxy-ethanol or butanol and glycols.

Additional polar organic solvents comprise alkyl ethers of glycols such as 1-methoxy-2-propanol, monoalkyl ethers of ethylene glycol, diethylene glycol, propylene glycol, ketones such as methyl ethyl ketone, methyl isobutyl ketone, isophorone; esters and ethers such as 2-ethoxyethyl acetate, 2-ethoxyethanol, aromatics such as toluene and xylene, nitrogen containing solvents such as dimethyl formamide and N-methyl pyrrolidone, and mixtures of the aforementioned.

Alternatively, the solvents may be water-based solvents. They can also be mixtures of water and organic solvents.

Particularly when using water-based solvents, the solution may further contain one or more wetting agents to improve the wetting of the non-conductive substrate surface. Suitable wetting agents or mixtures thereof include nonionic agents such as nonionic alkylphenol polyethoxy adducts or alkoxylated polyalkylenes and anionic wetting agents such as organic phosphate or phosphonate esters, as well as the diester. The amount of at least one wetting agent ranges from 0.0001 to 5 wt.-%, more preferably from 0.0005 to 3 wt.-% of the solution.

A solution of the metal acetate in ethanol is a preferred embodiment according to the present invention, with zinc acetate or aluminium acetate being most preferred. A metal oxide precursor compound may comprise a mixture of different salts, but preferably is one salt only.

Alternatively, the metal oxide compound can be directly deposited onto the surface of the non-conductive substrate. Both organic solvents as well as aqueous media can be used. Generally, the metal oxide compounds are not easily soluble in most common solvents and are therefore usually applied to the surface as a colloidal dispersion. Such colloidal dispersions are typically stabilized by surfactants or polymers. It is known to the person skilled in the art how to prepare such colloidal dispersions.

In methods according to the present invention, deposition of the metal oxide precursor compound is preferred.

The concentration of at least one metal oxide compound or metal oxide precursor compound preferably ranges from 0.005 to 1.5 mol/l, more preferably from 0.01 to 1.00 mol/l and most preferably from 0.1 to 0.75 mol/l.

The solution or dispersion containing the metal oxide compound or metal oxide precursor compound according to the present invention can be applied to the non-conductive substrate by methods such as dip-coating, spin-coating, spray-coating, curtain-coating, rolling, printing, screen printing, ink-jet printing and brushing. Such methods are known in the art and can be adapted to the plating method according to the present invention. Such methods result in a uniform film of defined thickness on the surface of the non-conductive substrate.

The contacting time with the solution or dispersion in step i. is for a time of 10 seconds to 20 minutes, preferably between 30 seconds and 5 minutes and even more preferred between 1 minute and 3 minutes. The application temperature depends on the method of application used. For example, for dip, roller or spin coating methods the temperature of application typically ranges between 5-90° C., preferably between 10 and 80° C. and even more preferred between 20 and 60° C. The application can be performed once or several times, e.g. two, three, four, five or up to ten times. The number of application steps varies and depends on the final thickness of the layer of the metal oxide compound desired. Generally, three to five application steps should be sufficient. It is recommended to at least partially dry the coating by removal of the solvent prior to application of the next layer. The suitable temperature depends on the solvent used and its boiling point as well as the layer thickness and can be chosen by the person skilled in the art by routine experiments. Generally, a temperature between 150 to up to 350° C., preferably between 200 and 300° C. should be sufficient. This drying or partial drying of the coating between individual application steps is advantageous as a non-crystalline metal-oxide is formed which is stable against dissolution in the solvent of the solution or dispersion containing the metal oxide compound or metal oxide precursor compound.

In step ii), heating is performed.

Figure 6:
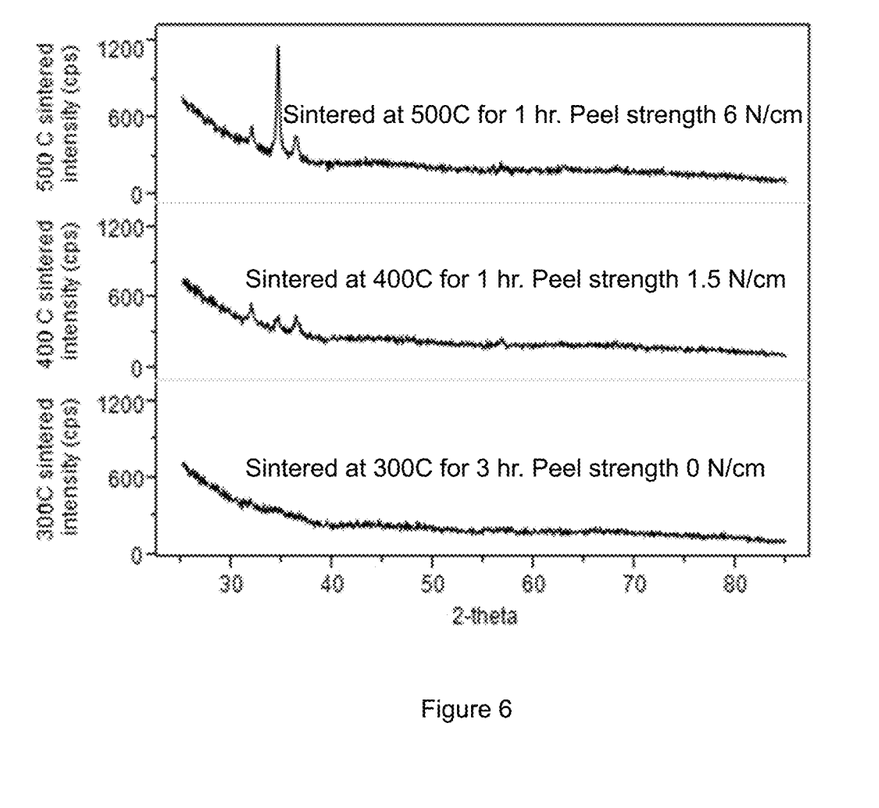
FIG. 6 shows a normal incidence X-Ray Diffraction (XRD) spectrum obtained on a SIEMENS D500 instrument (now Bruker AXS) with a Cu k-alpha radiation source (wavelength 1.54 A) for three different substrates being heated for 3 h in step ii) at 300° C. (bottom of the figure), 1 h at 400° C. (in the middle of the figure) and 1 h at 500°

This heating can be performed in one or more steps. At a certain stage, it requires a temperature of more than 350° C., preferably more than 400° C. The heating at elevated temperatures results in condensation of the metal oxide to form a mechanically stable metal oxide layer on the substrate surface. Often this metal oxide is in a crystalline state (see also FIG. 6). For ZnO the temperature in this heating step equals or exceeds 400° C.

The heating step ii) is sometimes also referred to as sintering. Sintering is the process of forming a solid, mechanically stable layer of material by heat without melting the material to the point of liquefaction. The heating step ii) is performed at a temperature in the range from 350 to 1200° C., more preferably from 350 to 800° C. and most preferably from 400 to 600° C.

The treatment time preferably is 1 min to 180 min, more preferably 10 to 120 min and most preferably 30 to 90 min.

In one embodiment of the present invention, it is possible to carry out the heating using a temperature ramp. This temperature ramp may be linear or non-linear. A linear temperature ramp is to be understood in the context of the present invention as a continuous heating starting at lower temperature and rising the temperature steadily until the final temperature is reached. A non-linear temperature ramp according to the present invention may include varying temperature rising speeds (i.e. the change of temperature over time) and may include times without temperature changes and thereby keeping the substrate at the same temperature for a certain period of time. A non-linear temperature ramp may also include linear temperature ramps. Regardless of the type of temperature ramp, it may be followed by a concluding heating step without any temperature change. The substrate may e.g. be kept at 500° C. for 1 h after the temperature ramp.

In one embodiment, a non-linear temperature ramp may include several heating steps as described herein such as the optional drying step and the essential sintering step with temperature rises in between those steps.

When applying a metal oxide precursor compound to form the layer of metal oxide, the steps preferably comprise:
- ia. contacting the substrate with a metal oxide precursor compound suitable to form the metal oxide compound upon heating and thereafter
- ib. heating the non-conductive substrate and thereby forming an adhesive layer of the metal oxide compound from the metal oxide precursor compound on at least a portion of the substrate surface.

Heating of the metal oxide precursor compound in step ia) results in the conversion into the corresponding metal oxide. Sometimes this heating is also referred to as pyrolysis. Pyrolysis is the thermochemical decomposition of a material at elevated temperatures with our without oxygen.

If the metal oxide precursor compound is an oxygen-containing compound like an acetate, heating step ia) does not necessarily require the presence of an oxygen-containing atmosphere, but can be performed in an oxygen-containing atmosphere. If the metal oxide precursor compound is not an oxygen-containing compound like a halide, heating step ia) does require presence of an oxygen-containing atmosphere.

If a metal oxide precursor compound is applied to the substrate, preferably a first heating is performed at elevated temperatures (step ia) and at temperatures generally lower than the sintering temperature. The temperature range depends on the metal oxide to be formed, the application mode and the precursor compound used. The person skilled in the art will select the appropriate temperature range for the specific metal oxide and precursor compound according to methods known in the art.

For example, the heating step ia) is performed at a temperature in the range from 100 to 600° C., more preferably from 150 to 400° C. and most preferably from 200 to 300° C.

The treatment time preferably is 1 min to 180 min, more preferably 10 to 120 min and most preferably 20 to 60 min.

The heating step ii) is performed at temperature and times as described above.

Alternatively, pyrolysis and the sintering can be performed in one step in the heating step ii. Generally, in this case, the temperature is slowly increased to first form the metal oxide compound from the metal oxide precursor compound during the pyrolysis step, e.g. by applying a temperature ramp as described above followed by the sintering.

The thickness of the metal oxide film on the non-conductive substrate is preferably 5 nm to 500 nm, more preferably 10 nm to 300 nm most preferably 20 nm to 200 nm.

Figure 5:
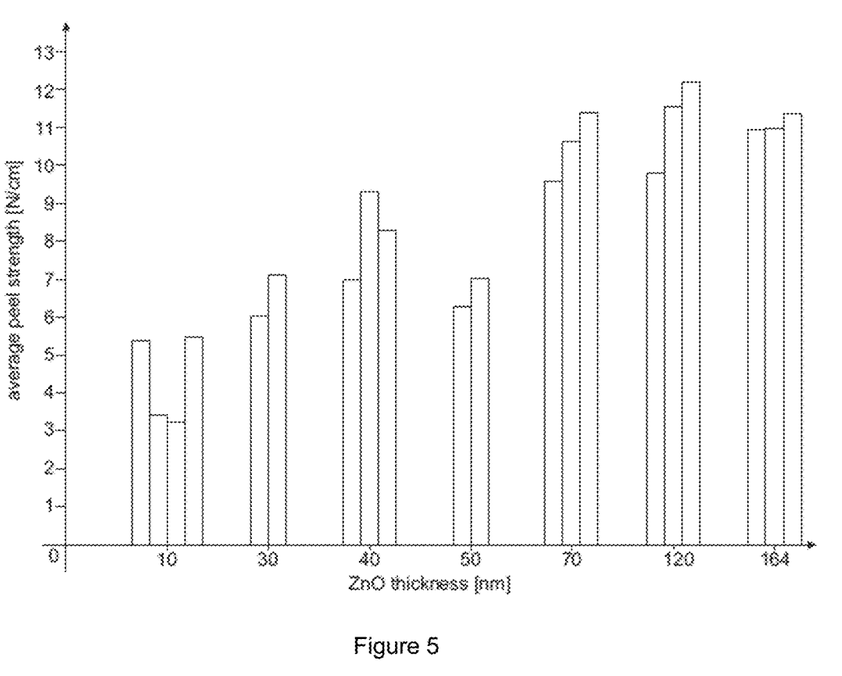
FIG. 5 shows the dependence of the adhesion strength of a plated copper layer from the metal oxide layer thickness.

The thickness of the metal oxide film obtained according to a of the present invention can be optimized to achieve very high adhesion of around 10 to 12 N/cm on e.g. plated copper layers with thicknesses of 15 μm. Considerable dependence on film thickness is observed at lower film thickness (10 to 50 nm), with steady performance seen above a thickness of around 75 nm (FIG. 5). However, even ultra-thin films provide adhesion values above 4 to 5 N/cm, which has been found to be sufficient for good performance in downstream steps such as through-via filling and fine-line patterning.

The crystallite size of the metal oxides generally have a mean diameter in the range of from 5 to 40 nm, with thicker films tending to the larger sizes.

Without being bound by this theory it is believed that upon conversion of the metal oxide precursor compound into the corresponding metal oxide inter-diffusion of the metal oxide into the substrate may occur and metal oxide bridge bonds to the substrate form. Also, sintering of the metal oxides is observed. The formed metal oxide (both when applied directly as a metal oxide compound as well as when applied as a metal oxide precursor compound and transformed into the corresponding oxide compound in step ii.) is well adhered to the surface of the non-conductive substrate. For example, if the non-conductive substrate is a glass substrate, covalent bonds are created between the glass substrate and the metal oxide via condensation of the OH-groups.

Figure 1:
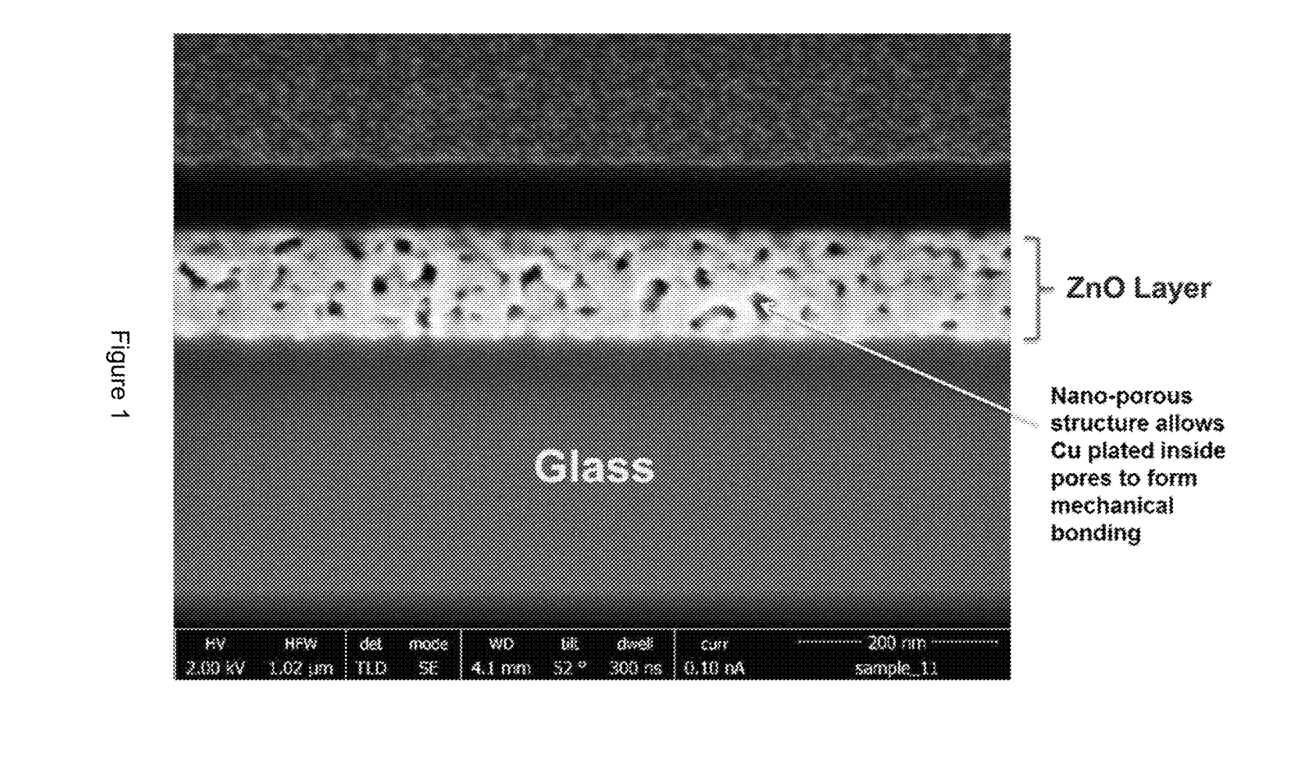
FIG. 1 shows an FIB image of a glass substrate having a zinc oxide layer obtained by a method according to the present invention. FIB/SEM analysis was carried out on a FEI Helios NanoLab 650 Dual Beam FIB. The regions of interest for FIB cuts were sputter coated with about 10 nm palladium (Pd, which is required to carry out the FIB measurement).
Figure 2:
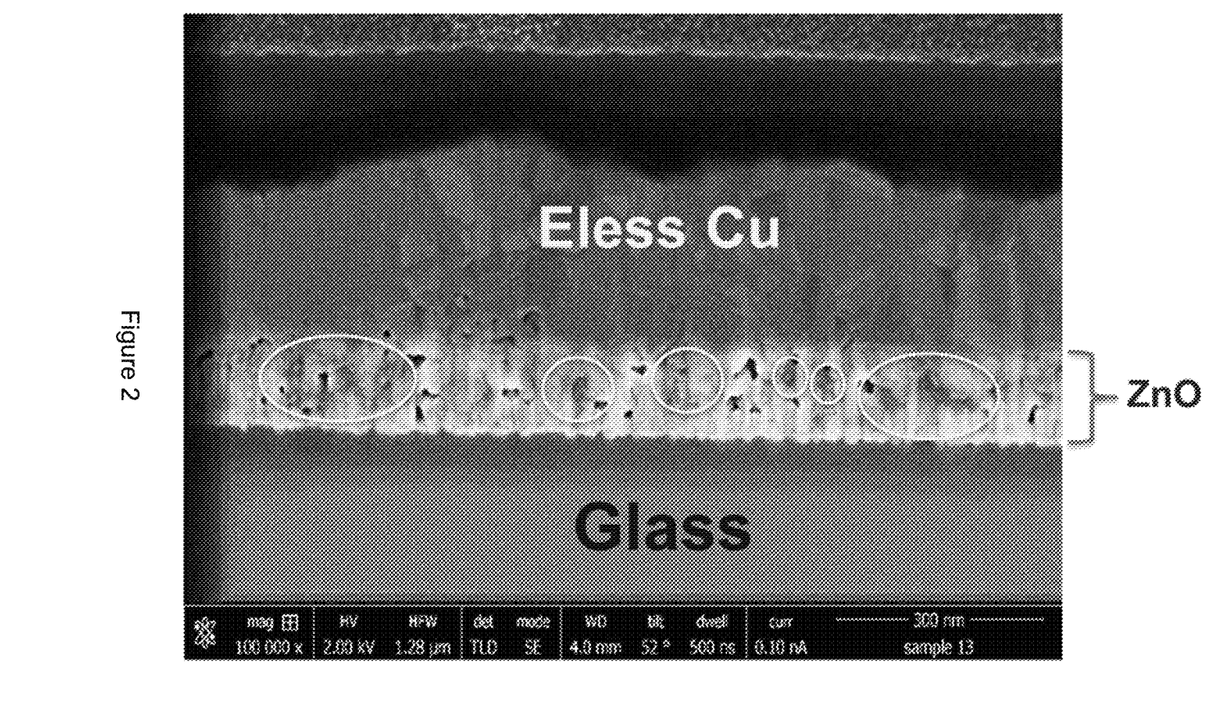
FIG. 2 shows an FIB image of a glass substrate having a zinc oxide layer obtained by a method according to the present invention and a subsequently plated electroless copper layer. The circles indicate that the copper penetrates the nano-pores of the zinc oxide layer which allows for strong chemical bonding between the glass substrate and the metal layer. FIB/SEM analysis was carried out on a FEI Helios NanoLab 650 Dual Beam FIB. The regions of interest for FIB cuts were sputter coated with about 10 nm palladium (Pd, which is required to carry out the FIB measurement).

The sintered metal oxide layer forms a mechanically stable, porous layer on glass Porosity as identified by image processing software (ImageJ 1.44o) is in the range of 20-40 vol % with individual pores ranging from 5-30 nm in diameter. Pore size generally increases with layer thickness. Furthermore, the porous structure provides mechanical anchors for the electroplated copper. This strong interaction is the basis for good adhesion of subsequently plated metal coatings on glass. FIG. 1 shows that the metal oxide layer on the glass substrate has a nano-porous structure which allows subsequently plated metal layers (e.g. copper) to form a mechanical bonding. This increases adhesion between the glass substrate and the metal layer. The resulting interpenetration of the copper and the metal oxide layer furthermore serves as a CTE buffer overcoming the CTE mismatch between copper and the substrate.

Figure 4:
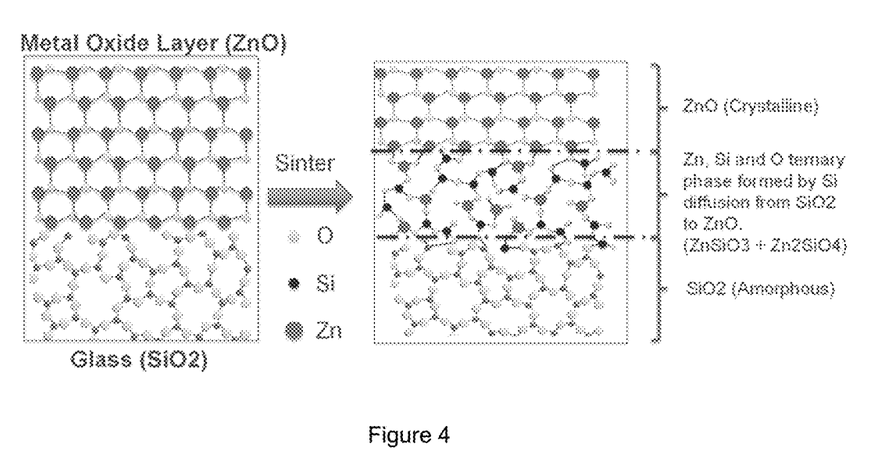

When analyzing a zinc oxide layer obtained according to Example 5, an interdiffusion layer of about 10-20 nm is formed by diffusion of $SiO_2$ (glass substrate) into the zinc oxide layer with the new species $ZnSiO_3$ and $ZnSiO_4$ being formed (FIG. 4). By means of this interdiffusion the metal oxide layer and the substrate are covalently bonded.

Despite this strong interaction the metal oxide layer is readily removable in an etchant solution from the substrate and compatible with patterning applications, as is discussed below.

The average surface roughness $S_a$ of the such obtained surface ranges between 5 nm and 60 nm depending on process conditions.

Figure 3:
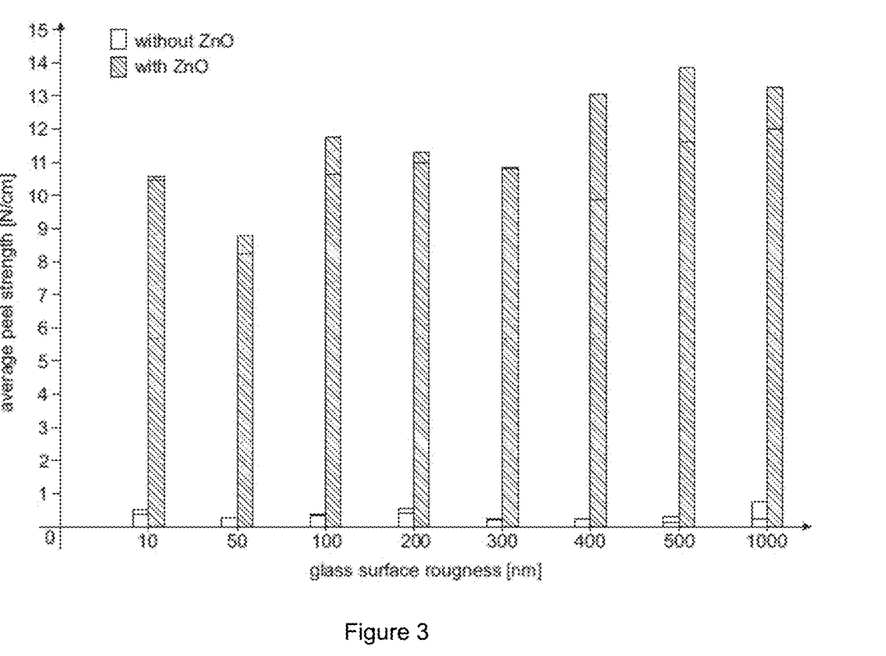
FIG. 3 shows the adhesion strength of the metal plated layer on a glass substrate versus the surface roughness for a substrate treated according to a method of the present invention (with zinc oxide metal layer) and a comparative example (without zinc oxide metal layer). In the columns the maximum value (upper line) and the average (line below) values are shown.

Mechanical roughening of the glass substrate from 10 nm to 1000 nm was tested for its impact on adhesion strength between glass and copper. Roughening was performed prior to application of the metal oxide layer. For methods according to the present invention, very limited impact is expected from this as the major mechanism for good adhesion is not based on mechanical anchoring at the glass interface. Samples which were treated according to a method of the present invention showed very high peel strength of above 8 N/cm with no need for substrate roughening (FIG. 3). The process sequence for these tests is in accordance with that used in Example 5 and described below. Above 8 N/cm, a moderate increase in peel strength with higher roughness could be seen, possibly due to higher glass surface area leading to more locations for covalent bonding. Control samples that were not treated with a method according to the present invention and not having a metal oxide layer between the glass substrate and the metal layer showed little to no adhesion, regardless of the substrate roughness.

Optionally, the method can comprise a further step which is performed after method step ii.
- iia. contacting the substrate with an aqueous acidic or aqueous alkaline solution.

This additional step increases the surface roughness by about 10-50 nm, but does not exceed 200 nm. The increased roughness is within a range to increase the adhesion of the metal layer to the non-conductive substrate surface without negatively affecting its functionality.

The aqueous acidic solution preferably is an aqueous acidic solution having a pH value of between pH=1-5. Various acids can be used, for example sulphuric acid, hydrochloric acid, or organic acids like acetic acid.

The aqueous alkaline solution alternatively is an aqueous alkaline solution having a pH value of between pH=10-14. Various sources of alkalinity can be used, for example hydroxide salts like sodium, potassium, calcium hydroxide or carbonate salts.

The metal oxide layer is obtained according to a method of the present invention and forms a porous film that can catalyse electroless and electrolytic metal plating, e.g. of copper onto substrates like glass. It makes use of chemical and mechanical anchoring to function as an intermediate layer between e.g. glass and copper. This intermediate layer:
(a) forms strong covalent bonds at the glass interface that are robust enough to anchor the plated metal film thereto;
(b) acts as a porous mechanical anchoring depot at the copper interface for copper to be plated on with high adhesion;
(c) acts as a CTE buffer zone with gradually increasing CTE from the metal oxide moiety to the copper interface.

Thereafter, the surface of the non-conductive substrate bearing the adhesive layer is metal plated in step iii. described above applying a wet-chemical plating method.

Wet-chemical plating methods are well known to the person skilled in the art. Typical wet-chemical plating methods are electrolytic plating applying an external current, immersion plating using the difference in redox potential of the metal to be deposited and the metal on the substrate surface or an electroless plating method using a chemical reducing agent contained in the plating solution.

In a preferred embodiment of the present invention the wet chemical plating method comprises an electroless plating method with the following steps:
iiia. contacting the substrate with an aqueous solution comprising a catalytic metal and thereafter
iiib. contacting the substrate with an aqueous electroless metal plating solution which comprises a source of the metal ion to be plated and a reducing agent.

For electroless plating the substrate is contacted with an electroless plating bath containing for example Cu-, Ni-, Co- or Ag-ions. Typical reducing agents comprise formaldehyde, hypophosphite salts like sodium hypophosphite, glyoxylic acid, DMAB (dimethylaminoborane), or $NaBH_4$.

In step iiia, the non-conductive substrate bearing an adhesive layer of the metal oxide compound is contacted with an aqueous solution comprising a catalytic metal. The catalytic metal (step iiia.) is required to initiate the electroless plating of the metal layer according to step iiib.

The adhesive layer of the metal oxide compound is activated with a catalytic metal selected from the group comprising copper, silver, gold, ruthenium, rhodium, palladium, osmium, iridium and platinum. The most preferred catalytic metal is palladium.

The catalytic metal can either be deposited onto the adhesive layer of the metal oxide compound in form of ions or as a colloid.

When using a catalytic metal in form of ions the substrate surface is only activated for successive electroless plating on those areas of the substrate surface which consist of the metal oxide compound layer. Hence, no mask such as a patterned photo resist is required for a selective electroless deposition in step iiib. of the plating method according to the present invention.

Said catalytic metal in form of ions is reduced to its metallic state in a separate step by contacting the substrate with a solution, preferably an aqueous solution comprising a reducing agent such as hypophosphite ions and/or a borane compound such as a borane-alkylamine adduct or sodium borohydride.

Activators comprising a catalytic metal in form of ions and their use are known in the art and can be used in the plating method according to the present invention accordingly.

A catalytic metal provided in form of colloids is deposited onto the entire substrate surface by adsorption. In case the metal layer is to be selectively deposited by electroless plating in step iiib., those portions of the substrate surface where no metal layer should be deposited in step iiib. need to be covered by a mask such as a patterned photo resist prior to deposition of the catalytic metal in form of a colloid. If such portions of the substrate are not covered the metal layer will be deposited in step iiib. onto the entire substrate surface. In such a case an etching process needs to be applied after electroless plating in order to obtain a patterned metal layer.

Applicable activator compositions providing the catalytic metal in ionic or colloidal form are for example disclosed in ASM Handbook, Vol. 5: Surface Engineering, p. 317-318.

Preferably, the electroless metal plating solution in step iiib. is a copper, copper alloy, nickel or nickel alloy bath composition suitable to deposit the corresponding metal or metal alloy.

Most preferably, copper or copper alloys are deposited during the wet chemical metal deposition, with electroless plating being the most preferred method for wet chemical metal deposition.

Copper electroless plating electrolytes comprise generally a source of copper ions, pH modifiers, complexing agents such as EDTA, alkanol amines or tartrate salts, accelerators, stabilizer additives and a reducing agent. In most cases formaldehyde is used as reducing agent, other common reducing agents are hypophosphite, dimethylamine borane and borohydride. Typical stabilizer additives for electroless copper plating electrolytes are compounds such as mercaptobenzothiazole, thiourea, various other sulphur compounds, cyanide and/or ferrocyanide and/or cobaltocyanide salts, polyethyleneglycol derivatives, heterocyclic nitrogen compounds, methyl butynol, and propionitrile. In addition, molecular oxygen is often used as a stabilizer additive by passing a steady stream of air through the copper electrolyte (ASM Handbook, Vol. 5: Surface Engineering, pp. 311-312).

Other important examples for electroless metal and metal alloy plating electrolytes are compositions for deposition of nickel and alloys thereof. Such electrolytes are usually based on hypophosphite compounds as reducing agent and further contain mixtures of stabilizer additives which are selected from the group comprising compounds of Group VI elements (S, Se, Te), oxo-anions ($AsO_2^-$, $IO_3^-$, $MoO_4^{2-}$), heavy metal cations ($Sn^{2+}$, $Pb^{2+}$, $Hg^+$, $Sb^{3+}$) and unsaturated organic acids (maleic acid, itaconic acid) (Electroless Plating: Fundamentals and Applications, Eds.: G. O. Mallory, J. B. Hajdu, American Electroplaters and Surface Finishers Society, Reprint Edition, pp. 34-36).

In subsequent process steps the electrolessly deposited metal layer can be further structured into circuitry.

In an alternative embodiment of the present invention deposition of the metal layer can be from an aqueous electroless metal plating solution with UV light thus obviating a catalyst activation step and comprises the following step:

iiia. contacting the substrate with an aqueous electroless metal plating solution which comprises a source of the metal ions to be plated and a reducing agent to deposit a metal layer and irradiating the substrate with UV light for a period of time during the plating process.

Irradiating the substrate with UV light for a period of time during the plating process can mean that irradiation is over the entire period of the plating process or at the initial stage of the plating process only. In general, it is sufficient to irradiate the substrate during the first stage of the plating process only, e.g. during the first 1 to 5, 10, 20 or 30 minutes of the plating process until a first nucleation site of metal has been formed.

The wavelength of the UV light can vary between 200 nm and 450 nm, preferably between 300 nm and 400 nm. The energy of the UV light can be adjusted to the substrate and can vary over a wide range, e.g. between 0.1 to 300 mW/cm$^2$, preferably between 1 to 100 mW/cm$^2$ and most preferably between 2 to 75 mW/cm$^2$.

In one embodiment of the present invention at least one additional metal or metal alloy layer is deposited by electroplating on top of the metal or metal alloy layer obtained in step iiib.

A particularly preferred embodiment to metal plate the substrate applying a wet-chemical plating method comprises:
iiib. contacting the substrate with an electroless metal plating solution; and
iiic. contacting the substrate with an electrolytic metal plating solution.

For electrolytic metallisation, it is possible to use any desired electrolytic metal deposition baths in step iiic., for example for deposition of nickel, copper, silver, gold, tin, zinc, iron, lead or alloys thereof. Such deposition baths are familiar to those skilled in the art.

A Watts nickel bath is typically used as a bright nickel bath, this comprising nickel sulfate, nickel chloride and boric acid, and also saccharine as an additive. An example of a composition used as a bright copper bath is one comprising copper sulfate, sulphuric acid, sodium chloride and organic sulphur compounds in which the sulphur is in a low oxidation state, for example organic sulphides or disulphides as additives.

In yet another embodiment, where the deposited adhesive metal oxide layer is intrinsically highly conductive such as ZnO/Al$_2$O$_3$, the metal oxide layer can be directly electrolytically plated without requiring an intermediate electroless metallisation step:
i. depositing on at least a portion of the non-conductive substrate surface a metal oxide compound selected from the group consisting of zinc oxides, titanium oxides, zirconium oxides, aluminum oxides, silicon oxides, and tin oxides or mixtures of the aforementioned and thereafter;
ii. heating the non-conductive substrate and thereby forming an adhesive layer of the metal oxide compound on at least a portion of the substrate surface; and directly thereafter;
iii. metal plating at least the substrate surface bearing the adhesive layer of the metal oxide compound applying a wet-chemical electrolytic plating method and thereafter;
iv. heating of the metal plated layer to a maximum temperature of between 150 and 500° C.

The inventors have found that heat treating the deposited metal layers greatly increases the peel strength (PS) of the metal layer to the underlying non-conductive substrate. The extent of the increase was surprising. Such heat treatment is also called annealing. Annealing is a known treatment method to alter the material properties of the metal and for example increases its ductility, relieves internal stress and refines the metal structure through purification of the layers by removing volatiles and defects. It was not apparent that such annealing also results in greatly increased peel strength between the deposited metal layer and the non-conductive substrate surface. In addition the invention also allows the deposition of thicker metal layers with good peel strength which otherwise would have resulted in delamination.

Such heat treatment is performed in step iv. according to the method of the present invention after the final metal plating step:
iv. heating of the metal plated layer to a maximum temperature of between to 150 and 500° C.

For this heat treatment the substrate is slowly heated to a maximum temperature of between 150 and 500° C., preferably up to a maximum temperature of 400° C. and even more preferred up to a maximum temperature of 350° C. The treatment time varies depending on the substrate material, the plated metal and the thickness of the plated metal layer and can be determined by routine experiments by the person skilled in the art. Generally, the treatment time ranges between 5 and 120 minutes, preferably between 10 and 60 minutes and even more preferred a treatment time of up to 20, 30 or 40 minutes is sufficient.

It is even more advantageous to perform the heat treatment in two, three or even more steps with a sequential increase of hold temperature during the individual steps. Such a stepwise treatment results in particularly high peel strength values between the plated metal layer and the non-conductive substrate.

Typical temperature profiles can be as follows:
a) 100-200° C. for 10-60 min and thereafter 150-400° C. for 10-120 min or
b) 100-150° C. for 10-60 min and optionally thereafter 150-250° C. for 10-60 min and thereafter 230-500° C. for 10-120 min.

If the method according to the present invention comprises an electroless metal plating step and an electrolytic metal plating step it is recommended to apply a heat treatment step after each metal plating step. The heat treatment after the electroless metal plating step can be performed as described above. Often it is sufficient to perform a one-step heat treatment at a temperature of up to a maximum of between 100 and 250° C. for 10 to 120 minutes.

EXAMPLES

The following experiments are meant to illustrate the benefits of the present invention without limiting its scope.

The following commercially available three samples were treated (all: 1.5×4.0 cm slides):
Borosilicate Glass ($S_a$<10 nm).
Ceramic substrate, Al$_2$O$_3$ ($S_a$=450 nm).

The samples are cleaned and treated as described below.
In the experiments the different experimental conditions are listed and identified in Table 1.

Example 1 (Comparative)

A glass sample (as described above) successively sputter-coated with a 20 nm Ti adhesive layer and a 400 nm Cu seed layer was prepared.

The Cu sputtered glass sample was annealed for 30 minutes at a temperature of 180° C. and cleaned from oxides with diluted sulfuric acid (5%) at ambient temperature for 1 minute.

Electrolytic (acid) copper from commercially available electrolytic copper plating bath (Cupracid, Atotech Deutschland GmbH) was plated at a current density of 1.5 ASD to a thickness of 15 µm and stepwise annealed at a temperature of 120° C. for 10 min and thereafter at a temperature of 180° C. for 30 min. A second substrate was likewise metal plated and thereafter stepwise annealed at a temperature of 120° C. for 10 min, thereafter at 180° C. for 30 min and finally at a temperature of 250° C. for 30 min.

No copper separation from the substrate (blistering) was observed. The first sample heated to a temperature of 180° C. exhibits a PS (peel strength or adhesion strength) of 0.69 N/cm. The sample heated to a temperature of 250° C. shows a PS of 1.00 N/cm.

Example 2

Comparative

Two samples, a glass and ceramic ($Al_2O_3$) were cleaned as described in Example 1.

The substrates were thereafter treated with a commercial Pd/Sn catalyst (Adhemax Activator, Atotech Deutschland GmbH) containing 50 ppm Pd and 2.5 g/l of $SnCl_2$ as a colloid for 5 minutes at a temperature of 25° C. followed by DI water rinsing and an acceleration step (Adhemax Accelerator, Atotech Deutschland GmbH) typical for increasing the catalytic activity of the Pd catalyst.

After this, the substrates were fully immersed into a electroless Cu plating bath (containing copper sulfate as the copper ion source and formaldehyde as a reducing agent) at a temperature of 37° C. for 4 minutes resulting in a plating thickness of about 0.25 µm of Cu. Samples were first annealed at a temperature of 120° C. for 10 minutes and then at a temperature of 180° C. for 30 minutes.

Adhesion of the plated layer was tested by attaching a Scotch adhesive tape (~2 N/cm) to the electroless Cu layer and peeling it off with a rapid movement at a 90 degree angle. If the adhesive tape can be removed from the copper metal layer without peeling the metal layer off, the adhesion strength of the metal layer exceeds 2 N/cm. There was complete separation of the electroless copper layer from the substrate for all sample types, the PS is below 2 N/cm ("fail").

Electrolytic copper (from a commercially available acidic electrolytic copper plating bath available from Atotech Deutschland GmbH, Cupracid) was plated at a current density of 1.5 ASD to 15 µm Cu thickness and lead to complete delamination of the plated layers. Additional annealing experiments were therefore not performed.

Example 3

Glass substrates were cleaned as described above and dip-coated with ZnO.

For the dip coating, substrates were vertically immersed into a solution of 0.5 mol/l $Zn(OAc)_2 \times 2H_2O$ in EtOH at ambient temperature and removed vertically at a speed of 10 cm/min. They were subsequently dried for 15 minutes at a temperature of 250° C. The process was repeated 3 times. The substrates were then subjected to a heat ramp of 4° C./min until the final temperature of 500° C. was reached.

They were then sintered at the temperature of 500° C. for one hour in air. The thickness of the ZnO layer was about 150 nm.

After cooling to ambient temperature, this was followed by treatment with an aqueous solution containing $Na_2PdCl_4$ (100 ppm) for 30 seconds. This solution served as electroless catalyst solution. A reduction step of the palladium ions to palladium metal was not required.

Substrates were then fully immersed into an electroless Cu plating bath commercially available from Atotech Deutschland GmbH which contained copper sulfate as the copper ion source and formaldehyde as the reducing agent at a temperature of 37° C. for 5 minutes resulting in a 400 nm electroless copper layer in the coating area (substrate surface structured) only. The non-coated slide sections remained unplated.

Electroless plated samples were annealed first at a temperature of 120° C. for 10 minutes and thereafter at 180° C. for 30 minutes.

Thereafter, electrolytic copper (commercially available electrolytic copper plating bath from Atotech Deutschland GmbH, Cupracid) was plated at a current density of 1.5 ASD to a thickness of 15 µm. Adhesion was evaluated with and without annealing.

Annealing was performed stepwise for the three samples with different temperature profiles:
a) 120° C./10 min and 180° C./30 min
b) 120° C./10 min, 180° C./30 min and 250° C./30 min, and
c) 120° C./10 min, 180° C./30 min and 350° C./30 min.

Without annealing after electrolytic copper deposition PS was only about 0.3 N/cm (lower measurement limit). Annealed samples were cooled to ambient temperature. After annealing according to a profile a) a PS of 1.1 N/cm of the deposited metal layer was obtained, after annealing according to a profile b) a PS of 2.7 N/cm of the deposited metal layer was obtained and after annealing according to a profile c) a PS of 5.5 N/cm of the deposited metal layer was obtained. This demonstrates the beneficial effect of annealing for the peel strength (PS).

After reflow at a temperature of 260° C. there was no delamination of the annealed samples and the initial PS was maintained. This reflow test was performed to simulate component attachment heat stress during reflow soldering.

Example 4

UV-Activation

Glass substrates were cleaned as described above and dip-coated with ZnO.

For the dip coating, substrates were vertically immersed into a solution of 0.5 mol/l $Zn(OAc)_2 \times 2H_2O$ in EtOH at ambient temperature and removed vertically at a speed of 10 cm/min. They were subsequently dried for 15 minutes at a temperature of 250° C. The process was repeated 3 times. The substrate was subjected to a heating step with a temperature ramp of 4° C./min starting at room temperature until 500° C. were reached. Finally, it was pyrolyzed and sintered at the temperature of 500° C. for one hour in air. The thickness of the ZnO layer was about 150 nm.

Substrates were then fully immersed into an electroless Cu plating bath commercially available from Atotech Deutschland GmbH which contained copper sulfate as the copper ion source and formaldehyde as the reducing agent at a temperature of 37° C. while irradiating with UV light (wavelength 365 nm, energy 2.65 mW/cm$^2$) for activation. The UV light was turned off after 10 minutes. During irradiation a thin layer of electroless copper was deposited on the substrate which had a sufficient thickness to promote further plating. Electroless Cu plating was continued for another 15 min resulting in a 1 μm electroless copper layer in the coating area only. The non-coated slide sections remained unplated.

Electrolessly plated samples were annealed first at a temperature of 120° C. for 10 minutes and then at a temperature of 180° C. for 30 minutes.

Thereafter, electrolytic copper (commercially available electrolytic copper plating bath from Atotech Deutschland GmbH, Cupracid) was plated at a current density of 1.5 ASD to a thickness of 15 μm. Adhesion was evaluated with and without annealing.

Annealing was performed stepwise for the three samples with different temperature profiles:
a) 120° C./10 min and 180° C./30 min and
c) 120° C./10 min, 180° C./30 min and 350° C./30 min.

Without annealing after electrolytic copper deposition PS was about 0.3 N/cm (lower measurement limit).

After annealing according to a profile a) a PS of 1.6 N/cm of the deposited metal layer was obtained, after annealing according to a profile c) a PS of 6.3 N/cm of the deposited metal layer was obtained. This demonstrated the beneficial effect of annealing for the peel strength (PS).

After reflow at a temperature of 260° C. there was no delamination of the annealed samples and the initial PS was maintained. This reflow test was performed to simulate component attachment heat stress during reflow soldering.

Example 5

Glass substrates were cleaned as described above and dip-coated with ZnO.

For the dip coating, substrates were vertically immersed into a solution of 0.5 mol/l $Zn(OAc)_2 \times 2H_2O$ in EtOH at ambient temperature and removed vertically at a speed of 10 cm/min. They were subsequently dried for 15 minutes at a temperature of the 250° C. The process was repeated 3 times. The substrate was then pyrolyzed and sintered at the temperature of 500° C. for one hour in air. The thickness of the ZnO layer was about 150 nm.

Substrates were then fully immersed into an electroless Cu plating bath commercially available from Atotech Deutschland GmbH which contained copper sulfate as the copper ion source and formaldehyde as the reducing agent at a temperature of 37° C. while irradiating with UV light (wavelength 365 nm, energy 2.65 mW/cm²) for activation. The UV light was turned off after 10 minutes. During this time a thin layer of electroless copper was deposited on the substrate which had a sufficient thickness to promote further plating. Electroless Cu plating was continued for another 15 min resulting in a 1 μm electroless copper layer in the coating area only. The non-coated slide sections remained unplated.

Electroless plated samples were annealed first at a temperature of 120° C. for 10 minutes and then at a temperature of 180° C. for 30 minutes.

Thereafter, electrolytic copper (commercially available electrolytic copper plating bath from Atotech Deutschland GmbH, Cupracid) was plated at a current density of 1.5 ASD to a thickness of 15 μm and 30 μm, respectively. At this point the substrate with 30 μm Cu showed delamination and was not further processed.

Substrates with 15 μm Cu were annealed at the following temperature profile:
c) 120° C./10 min, 180° C./30 min and 350° C./30 min.

They were cooled to ambient temperature and further plated in above mentioned electrolytic copper plating bath to a total thickness of 30 μm.

No copper separation from the substrate (blistering) was observed. A high PS of 7.8 N/cm was measured. This experiment clearly demonstrates the beneficial effect of annealing and that it enabled further plating onto an annealed metal layer.

After reflow at a temperature of the 260° C. there was no delamination of the annealed samples and the initial PS was maintained. This reflow test was performed to simulate component attachment heat stress during reflow soldering.

This experiment demonstrated the capability of the method according to the invention to allow copper metal deposition of thickness values higher than 15 μm, e.g. 30 μm without delamination and high peel strength values.

Example 6

$Al_2O_3$ ceramic substrates were cleaned as described above and coated with ZnO by spray-pyrolysis.

For this a solution of 0.05 mol/l $Zn(OAc)_2 \times 2H_2O$ (metal oxide precursor compound) in EtOH was sprayed by a hand held air brush unit onto the ceramic substrates which were preheated to a temperature of 400° C.

The substrate was then pyrolyzed and sintered at a temperature of 500° C. for 1 h in air atmosphere. The thickness of the ZnO metal oxide layer was about 200 nm.

Substrates were then fully immersed into an electroless Cu plating bath commercially available from Atotech Deutschland GmbH which contained copper sulfate as the copper ion source and formaldehyde as the reducing agent at a temperature of 37° C. while irradiating with UV light (wavelength 365 nm, energy 2.65 mW/cm²) for activation. The UV light was turned off after 10 minutes. During this time a thin layer of electroless copper was deposited on the substrate which has a sufficient thickness to promote further plating. Electroless Cu plating was continued for another 15 min resulting in a 1 μm electroless copper layer in the coating area only. The non-coated slide sections remained unplated.

Electroless plated samples were annealed first at a temperature of 120° C. for 10 minutes and thereafter at 180° C. for 30 minutes.

Thereafter, electrolytic copper (commercially available electrolytic copper plating bath from Atotech Deutschland GmbH) was plated at a current density of 1.5 ASD to a thickness of 15 μm. Adhesion was evaluated with and without annealing.

Annealing was performed stepwise for the samples with different temperature profiles:
a) 120° C./10 min and 180° C./30 min
c) 120° C./10 min, 180° C./30 min and 350° C./30 min.

Without annealing after electrolytic copper deposition PS was only about 0.5 N/cm (lower measurement limit). Annealed samples were cooled to ambient temperature. After annealing according to a profile a) a PS of 4.2 N/cm of the deposited metal layer was obtained, after annealing according to a profile c) a PS of 8.0 N/cm of the deposited metal layer was obtained. This demonstrated the beneficial effect of annealing for the PS.

TABLE 1

Metallization conditions of various non-conductive substrates tested and adhesion values obtained

| Exp. # | MO treatment and electroless catalysis type | substrate | MO thickness (nm) | $S_a$ (nm) | Electroless Cu Scotch tape test (2 N/cm) | PS (N/cm) after 180° C. Anneal profile a) | PS (N/cm) after 250° C. Anneal profile b) | PS (N/cm) after 350° C. Anneal profile c) |
|---|---|---|---|---|---|---|---|---|
| 1 | None (Ti/Cu sputtercoat; comparative) | glass | — No oxide | <10 | pass | 0.7 (15 µm) Cu thickness | 1.0 (15 µm) | — |
| 2 | None (Pd/Sn catalysis; comparative) | glass | — No oxide | <10 | fail | 0 (15 µm) | — | — |
|   |   | $Al_2O_3$ | — | 450-480 | fail | 0 (15 µm) | — | — |
| 3 | ZnO dip ($Na_2PdCl_4$ catalysis) | glass | 150 | <10 | pass | 1.1 (15 µm) | 2.7 (15 µm) | 5.5 (15 µm) |
| 4 | ZnO dip (UV-catalysis) | glass | 150 | <10 | pass | 1.6 (15 µm) | — | 6.3 (15 µm) |
| 5 | ZnO dip (UV-catalysis; 2 step plating) | glass | 150 | <10 | pass | 0 (30 µm) | — | 7.8 (30 µm) |
| 6 | ZnO spray-pyrolysis (UV-catalysis) | $Al_2O_3$ | 200 | 480 | pass | 4.2 (15 µm) | — | 8.0 (15 µm) |

MO metal oxide compound
Pass: PS (peel strength, also denoted adhesion strength) equals or exceeds 2 N/cm
Fail: PS is less than 2 N/cm 90° peel strength (PS) measurements were performed with a digital force gauge and peel strength tester from IMADA. The PS values for all samples are depicted in Table 1, PS columns 7-9 and the values additionally provided in the Examples 1-6.

Adhesion of the plated layers was tested by attaching a Scotch adhesive tape (~2 N/cm) to the Cu layer and peeling it off with a rapid movement at a 90° angle. If the adhesive tape could be removed from the copper metal layer without peeling the metal layer off, the adhesion strength of the metal layer exceeds 2 N/cm ("pass" in Table 1). If the metal layer was peeled off, the adhesive strength was below 2 N/cm ("fail" in Table 1).

All samples which were metal plated with methods according to the present invention showed good adhesion of the metal layer to the underlying non-conductive substrate. Layer thickness of the oxide film was determined by step height on a Olympus LEXT 4000 confocal laser microscope. Roughness values were gathered over a surface area of 120 µm by 120 µm.

The invention claimed is:

1. Wet chemical method for plating a metal onto glass comprising the steps of:
   i. depositing on at least a portion of a surface of the glass a layer of a metal oxide compound selected from the group consisting of zinc oxides, titanium oxides, zirconium oxides, aluminum oxides, silicon oxides, tin oxides, and mixtures of the aforementioned, wherein the glass surface has an average surface roughness in a range from 0.1 to 100 nm, and
   depositing the layer of metal oxide compound comprises
   ia. contacting the glass with a solution comprising a metal oxide precursor compound suitable to form the metal oxide compound upon heating and thereafter
   ib. heating the glass at a temperature in a range from 100° C. to 300° C. and thereby forming the metal oxide compound from the metal oxide precursor compound; and thereafter
   ii. heating the glass at a temperature in a range from more than 400° C. to 600° C. and thereby forming an adhesive layer with a thickness of 5 nm to 10 nm of the metal oxide compound on at least a portion of the glass surface; and thereafter
   iii. metal plating at least the glass surface bearing the adhesive layer of the metal oxide compound by applying a wet-chemical plating method and thereafter;
   iv. heating for 5 to 120 minutes the metal plated layer to a maximum temperature of between 150 and 500° C.

2. Method according to claim 1 wherein the metal oxide compound is selected from the group consisting of ZnO, $TiO_2$, $ZrO_2$, $Al_2O_3$, $SiO_2$, $SnO_2$ and mixtures of the aforementioned.

3. Method according to claim 1 wherein the metal oxide compound is doped with germanium, aluminum, boron, arsenic or phosphorus in a content of between $10^{-9}$-10wt. %.

4. Method according to claim 1 wherein the heating in step iv. is performed in two steps and wherein the first heating step is at a temperature of up to a maximum of between 100 and 200° C. and the second heating step is at a temperature of up to a maximum of between 200 and 500° C.

5. Method according to claim 1 wherein in the step iii. the wet-chemical plating method comprises:
   iiia. contacting the glass with an aqueous solution comprising a catalytic metal and thereafter
   iiib. contacting the glass with an aqueous electroless metal plating solution which comprises a source of a metal ion to be plated and a reducing agent.

6. Method according to claim 5 wherein the step iii. further comprises in addition to the steps iiia. and iiib.:
   iiic. contacting the glass with an electrolytic metal plating solution.

7. Method according to claim 1 wherein in the step iii. the wet-chemical plating method comprises:
   contacting the glass with an aqueous electroless metal plating solution which comprises a source of a metal ions to be plated and a reducing agent to deposit a metal layer and irradiating the glass with UV light for a period of time during the plating method.

8. Method according to claim 7 wherein the wavelength of the UV light ranges between 200 nm and 450 nm.

9. Method according to claim 7 wherein in the step iii. the wet-chemical plating method further comprises, following the contacting the glass with an aqueous electroless metal plating solution and the irradiating, contacting the glass with an electrolytic metal plating solution.

10. Method according to claim 1 wherein the metal oxide precursor compound is selected from the group consisting of metal methoxylate, ethoxylate, propoxylate, butoxylate, acetate, acetyl-acetonates, nitrate, chloride, bromide and iodide.

11. Method according to claim 1 wherein a further method step is performed after method step ii.
   ii. a. contacting the glass with an aqueous acidic or aqueous alkaline solution.

12. Method according to claim 1 wherein the wet-chemical metal plating method comprises applying a solution that is a nickel or copper plating solution.

13. Method according to claim 1 wherein the heating in step iv. is between 10 and 120 minutes.

14. Method according to claim 1 wherein in step ia. the contacting comprises dipping the glass into said solution.

15. Method according to claim 1 wherein the glass comprises silica glass, soda-lime glass, float glass, fluoride glass, phosphate glass, borate glass, borosilicate glass, chalcogenide glass, and glass-ceramic materials.

16. Wet chemical method for plating a metal on glass comprising the steps of:
   i. depositing on at least a portion of a surface of the glass a layer of a metal oxide compound selected from the group consisting of zinc oxides, zirconium oxides, and mixtures of the aforementioned, wherein
   the glass surface has an average surface roughness in a range from 0.1 to 50 nm, and
   depositing the layer of metal oxide compound comprises
   ia. contacting the glass with a solution comprising a metal oxide precursor compound selected from the group consisting of metal methoxylate, ethoxylate, propoxylate, butoxylate, acetate, acetyl-acetonates, nitrate, chloride, bromide and iodide, each suitable to form the metal oxide compound upon heating and thereafter
   ib. heating the glass at a temperature in a range from 100° C. to 300° C. and thereby forming the metal oxide compound from the metal oxide precursor compound; and thereafter
   ii. heating the glass at a temperature in a range from 500° C. to 600° C. and thereby forming an adhesive layer with a thickness of 5 nm to 10 nm of the metal oxide compound on at least a portion of the glass surface; and thereafter
   iii. metal plating at least the glass surface bearing the adhesive layer of the metal oxide compound by applying a wet-chemical plating method depositing copper, nickel, or alloys thereof, and thereafter;
   iv. heating for 5 to 120 minutes the metal plated layer to a maximum temperature of between 150 and 500° C.

17. Method according to claim 16 wherein in step iii. copper or a copper alloy is deposited.

18. Wet chemical method for plating copper or copper alloy onto glass comprising the steps of:
   i. depositing on at least a portion of a surface of the glass a layer of zinc oxides, wherein
   the glass surface has an average surface roughness in a range from 0.1 to less than 50 nm, and
   depositing the layer of zinc oxides comprises
   ia. dipping the glass into a solution comprising a zinc oxide precursor compound selected from the group consisting of zinc methoxylate, ethoxylate, propoxylate, butoxylate, acetate, and acetyl-acetonates, each suitable to form the zinc oxides upon heating and thereafter
   ib. heating the glass at a temperature in a range from 100° C. to 300° C. and thereby forming the zinc oxides from the zinc oxide precursor compound; and thereafter
   ii. heating the glass at a temperature in a range from 500° C. to 600° C. and thereby forming an adhesive layer with a thickness of 5 nm to 10 nm of the zinc oxides on at least a portion of the glass surface; and thereafter
   iii. metal plating at least the glass surface bearing the adhesive layer of the zinc oxides by applying a wet-chemical plating method depositing copper or a copper alloy, and thereafter;
   iv. heating for 10 to 120 minutes the copper or copper alloy to a maximum temperature of between 150 and 500° C.

* * * * *